(12) United States Patent
Dintner et al.

(10) Patent No.: US 6,419,296 B2
(45) Date of Patent: Jul. 16, 2002

(54) ROOF ARRANGEMENT FOR A CONVERTIBLE

(75) Inventors: Thomas Dintner, Fürstenfeldbruck; Peter Reihl, Starnberg, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/725,950

(22) Filed: Nov. 30, 2000

(30) Foreign Application Priority Data

Nov. 30, 1999 (DE) .......................... 199 57 427

(51) Int. Cl.⁷ ................................. B60J 7/14
(52) U.S. Cl. ................ 296/107.18; 296/108; 296/107.2
(58) Field of Search ................. 296/107.16–107.2, 296/108, 116, 117

(56) References Cited

U.S. PATENT DOCUMENTS 5,542,735 A * 8/1996 Furst et al. ............ 296/107.18
5,769,483 A   6/1998 Danzl et al.
6,062,628 A * 5/2000 Guillez .................... 296/108 X

FOREIGN PATENT DOCUMENTS

DE             44 35 222        2/1995

* cited by examiner

Primary Examiner—Dennis H. Pedder
(74) Attorney, Agent, or Firm—Nixon Peabody LLP; David S. Safran

(57) ABSTRACT

In a roof arrangement for a convertible with a fixed roof part (5), a rigid rear part (4), and a storage compartment (33) for the folding top located in the rear area of the body (2) for holding the roof arrangement (3) and with a forced control mechanism (49) for opening and closing the roof arrangement (3) such that to open the roof arrangement (3), first the rear part (4) is swung over the roof part (5) and then the roof part (5) together with the rear part (4) stacked over it is swung into the storage compartment (33) for the folding roof, the forced control mechanism (49) has a single lever (55) which is located between the rear part (4) and the rear body (2) and which is connected by one end side via the first pivot joint (67) to the rear part (4) and is coupled by the other end side to the body (2).

20 Claims, 8 Drawing Sheets

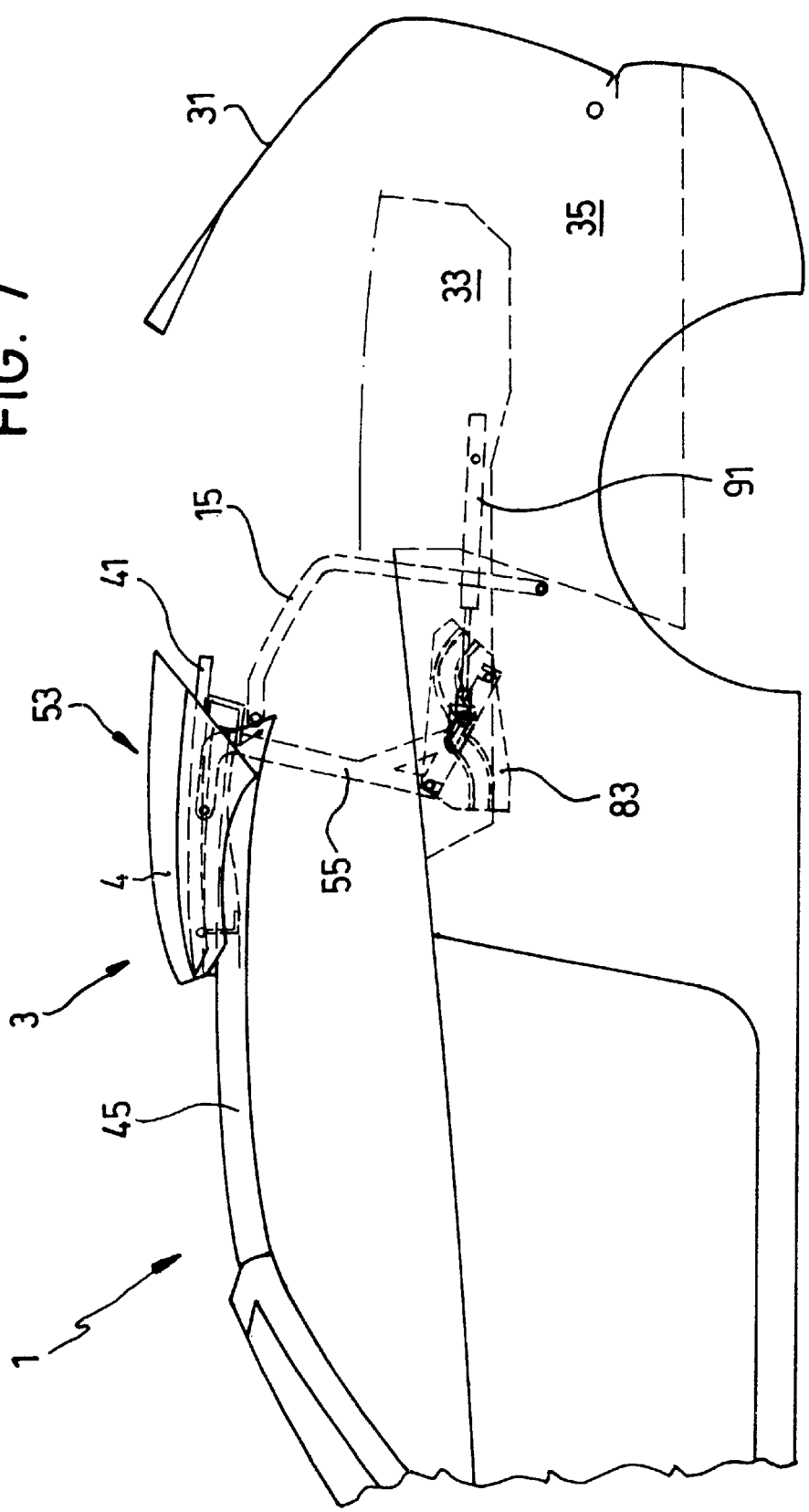

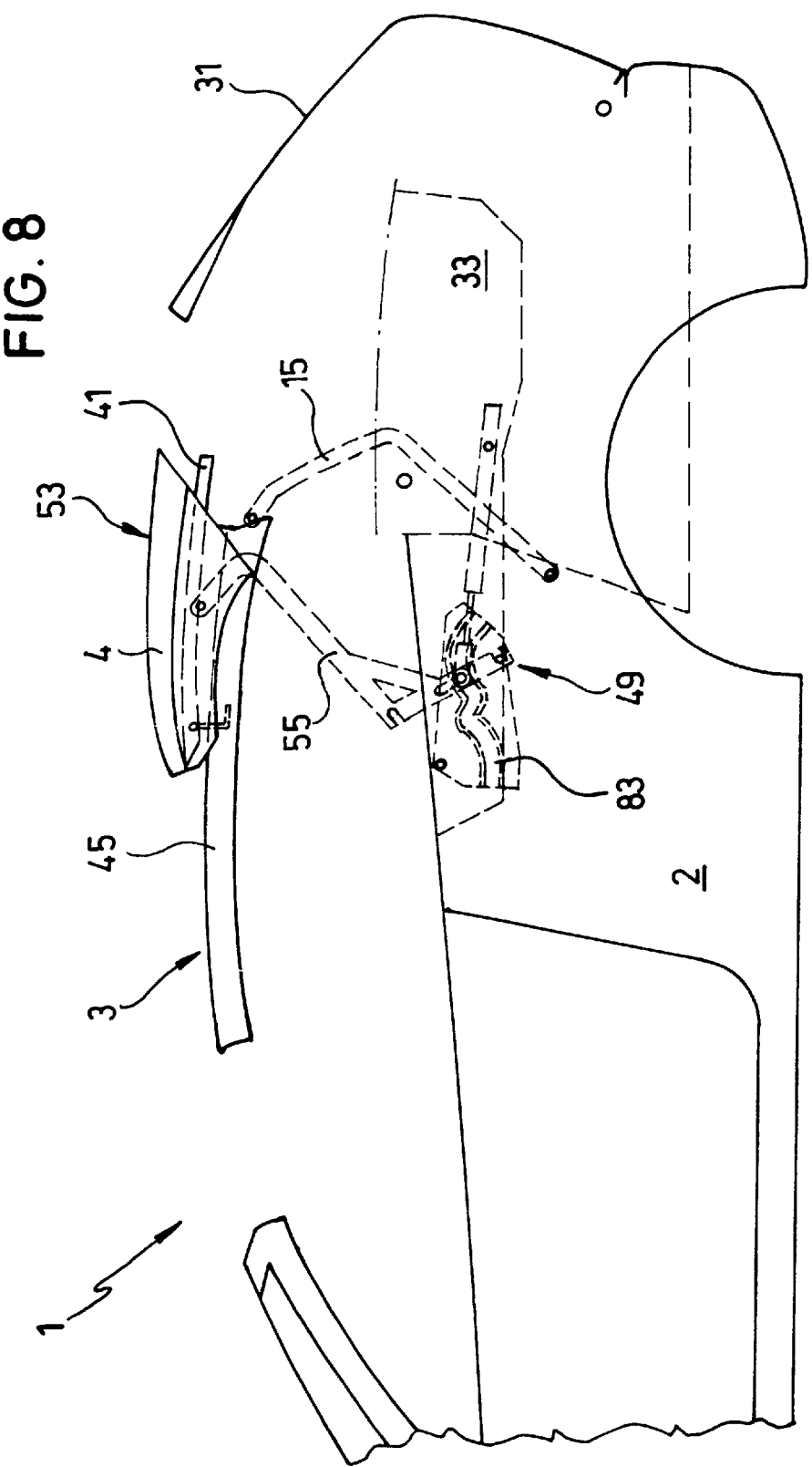

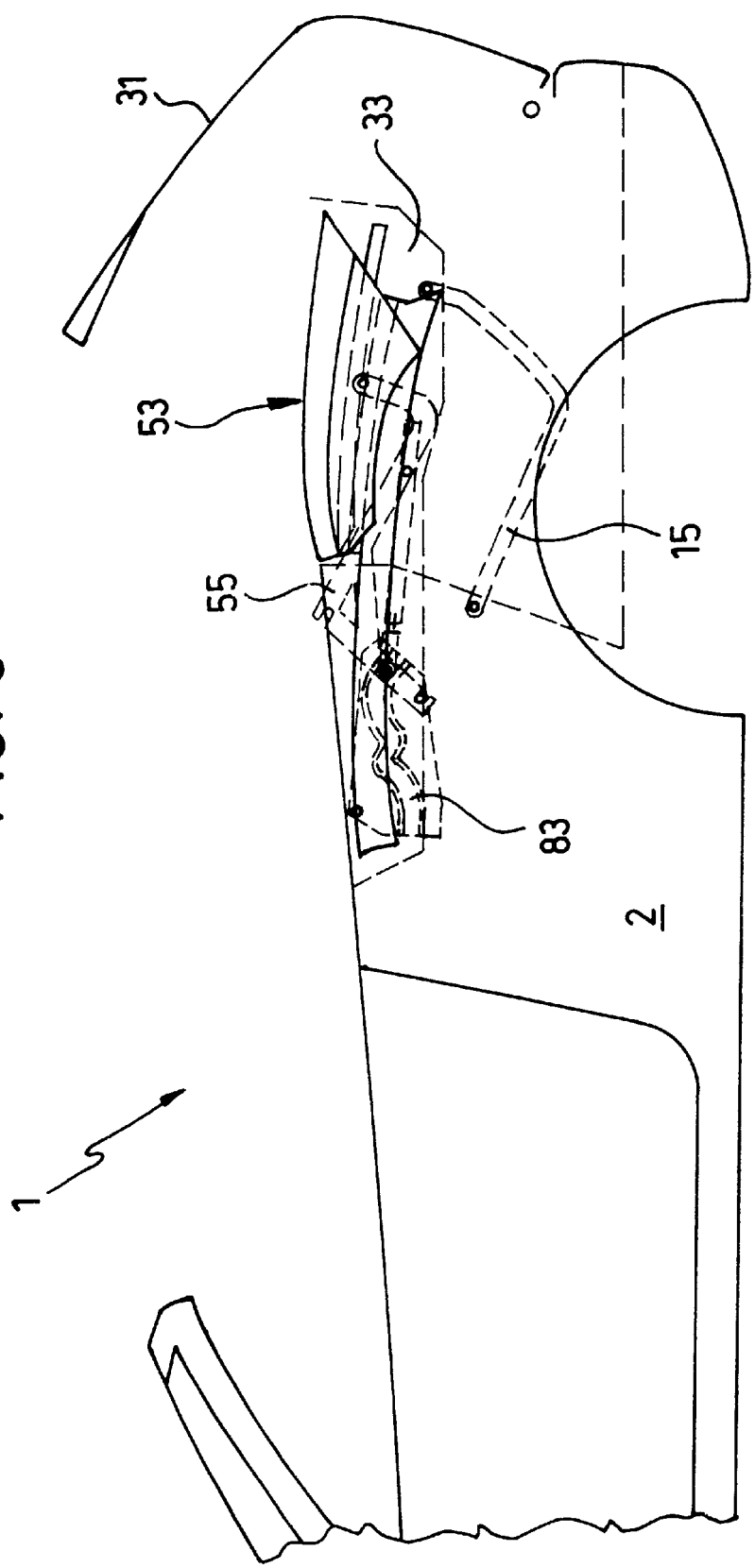

ROOF ARRANGEMENT FOR A CONVERTIBLE

BACKGROUND OF THE INVENTION

1. Field of the Invention

The invention relates to a roof arrangement for a convertible with a rigid front roof part and a rigid rear part, in which the rear part is swung over the front roof part and the two roof parts are lowered as a package into a rear storage compartment for the roof.

2. Description of Related Art

German Patent DE 44 35 222 C1 and corresponding U.S. Pat. No 5,769,483 show a roof arrangement for a convertible in which the rear part of the roof arrangement is swung over a front roof part and then the stacked roof parts are lowered rearwardly into a rear storage compartment for the roof. This way of stacking the front roof part and the rear part on top of one another, the two roof components coming to rest on top of one another in the same direction with respect to their arched curvature, has the advantage that the roof parts stacked into a package are arranged in a very space-saving manner and therefore require less space in the rear stowage space of the motor vehicle. To stack the roof parts on top of one another and to lower them into the rear stowage space or the storage compartment for the folding roof, in one embodiment, there is a mechanism in which a triangular lever is coupled to the body and can be driven via a drive cylinder. Between the triangular lever and the rear part there are two hydraulic cylinders and one telescoping guide. Furthermore, there is a pivot lever which, on the one hand, is coupled in the rear area of the body, and on the other hand, is connected to the rear end section of the roof part. When the roof arrangement is opened, first the rear part is moved radially outward by extending the two hydraulic cylinders and then the rear part is swung up over the roof part by a special locking means. At this point, the drive cylinder is retracted again, the roof arrangement being swung around a multi-joint to the rear into the stowage space. The multi-joint is formed, here, by one of the two hydraulic cylinders, a triangular lever, a drive cylinder and the pivoting lever. One of the two hydraulic cylinders must be released in this pivoting motion in order not to prevent pivoting motion into the stowage space because the two hydraulic cylinders, together with the pivoting lever, would otherwise represent a mechanical redundancy. The two hydraulic cylinders, together with the triangular lever and the drive cylinder, therefore, represent a multi-joint connection between the roof arrangement and the body.

In another embodiment, the rear part is coupled to the body via a four-bar mechanism with two levers. Since the rear part is swung by driving the four-bar mechanism over the roof part and is interlocked with the roof part, the stacked roof arrangement is swung to the rear into the storage compartment for the folding roof via the two levers of the four-bar mechanism and the other pivoting lever which is coupled between the roof part and the body. This arrangement of three levers between the stacked roof arrangement and the body represents a mechanical redundancy in which a pivoting motion is only possible when either a certain arrangement of the levers is chosen or one of the levers is detachably coupled during certain phases of motion.

The mechanical embodiments shown in German Patent DE 44 35 222 C1 and corresponding U.S. Pat. No. 5,769,483 are accordingly made very complex, and a host of drives is necessary to execute the motion for opening and closing the roof arrangement.

SUMMARY OF THE INVENTION

Therefore, an object of this invention is to devise a roof arrangement of the initially described type in which the inherently complex sequence of motions for opening and closing the roof arrangement is achieved by a simple mechanism with as few drive units as possible.

This object is achieved by a roof arrangement in which a forced control mechanism has a single lever which is located between the rear roof part and the rear body and which is connected at one end via a first pivot joint to the rear roof part and is coupled at another end to the body. For a convertible with a rigid front roof part, a rigid rear part and a storage compartment for the folding top located in the rear area of the vehicle for holding the roof arrangement and a forced control mechanism for opening and closing the roof arrangement, this approach calls for the fact that, to open the roof arrangement, first the rear part is swung over the front roof part and then the front roof part together with the rear roof part stacked over it are swung into the storage compartment for the folding roof, the forced control mechanism having a single lever which is located between the front roof part and the rear roof part and which is connected at one end, via the first pivot joint, to the rear part and is coupled at the other end to the body.

By providing a single lever between the rear part and the body, a simple mechanism is provided which, on the one hand, allows the rear part to be easily swung up over the front roof part, and on the other hand, after pivoting up, additional connecting levers need not be unlocked to enable pivoting of the entire stacked roof arrangement into the storage compartment for the folding roof.

In one embodiment, the first pivot joint is located in the line of gravity of the rear part. In this way, the rear part can be easily swung over the roof part. The rear part can be folded out especially advantageously by a guide means between the rear section of the front roof part and the top section of the rear part. The guide means has the advantage that the top end section of the rear part can be guided very closely and accurately with little mechanical effort over the rear section of the front roof part.

In one embodiment, the end section of the lever coupled to the body has an inner mounting point and an outer mounting point which is spaced away from the inner mounting point, and they can be selectively connected via a switching means either to a second pivot bearing or to a third pivot bearing. In this way, it is advantageously possible, on the one hand, to optimally fix the coupling point for pivoting up the rear part, and on the other hand, to optimally fix the coupling point for lowering the stacked roof arrangement for the lever. Furthermore, when using a lifting cylinder as the drive for the lever, the direction of rotation of the lever can be advantageously reversed at the same time with reversing from the one to the other pivot joint when the lifting cylinder is coupled between the inner and the outer mounting point.

In one advantageous embodiment, the switching means for reversing from the connection of the inner mounting point to the second pivot bearing to the connection of the outer mounting point to the third pivot bearing and vice versa has a locking mechanism, the lock being guided via a crank and the lifting cylinder being connected to the lever via the lock such that the lifting cylinder also drives the lock motion. The special advantage of this arrangement is that the lifting cylinder, during the switching process, does not cause any motion of the roof arrangement so that, simultaneously with the switching process, the rear part can be interlocked with the roof part in the stacked arrangement and the roof part with the windshield can be unlocked. In this way, also a precision transition from swinging up the rear part to lowering of the stacked roof arrangement is also possible without the lifting cylinder having to change its speed. The lifting cylinder can rather easily move from one end position to the other end position with a constant speed.

Preferred embodiments of the invention are described below with reference to the drawings.

BRIEF DESCRIPTION OF THE DRAWINGS

FIGS. 5 to 9 each show a stage in the opening process of the roof arrangement proceeding from the closed position of the roof arrangement shown in FIG. 3.

DETAILED DESCRIPTION OF THE INVENTION

Figure 1:
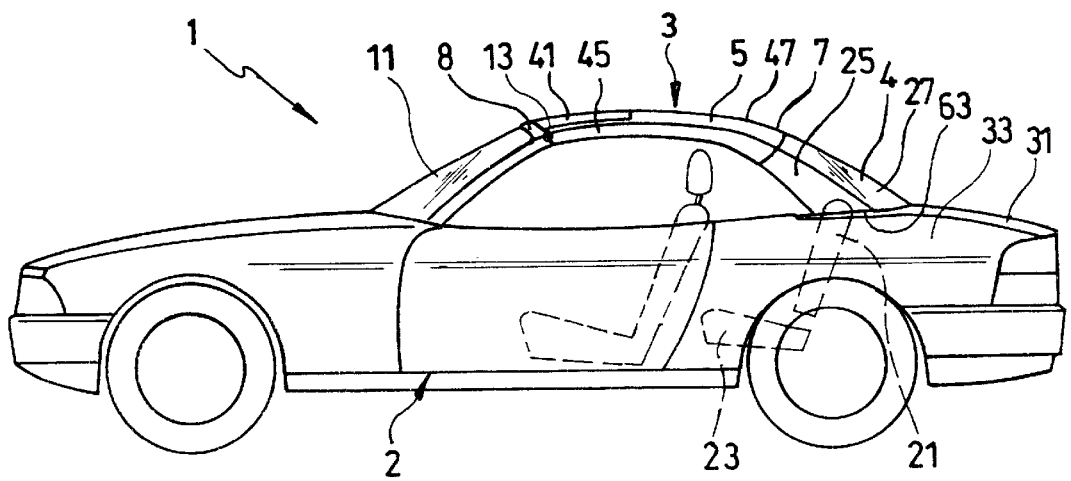
FIG. 1 is a schematic side view of a convertible with the roof arrangement closed.
Figure 2:
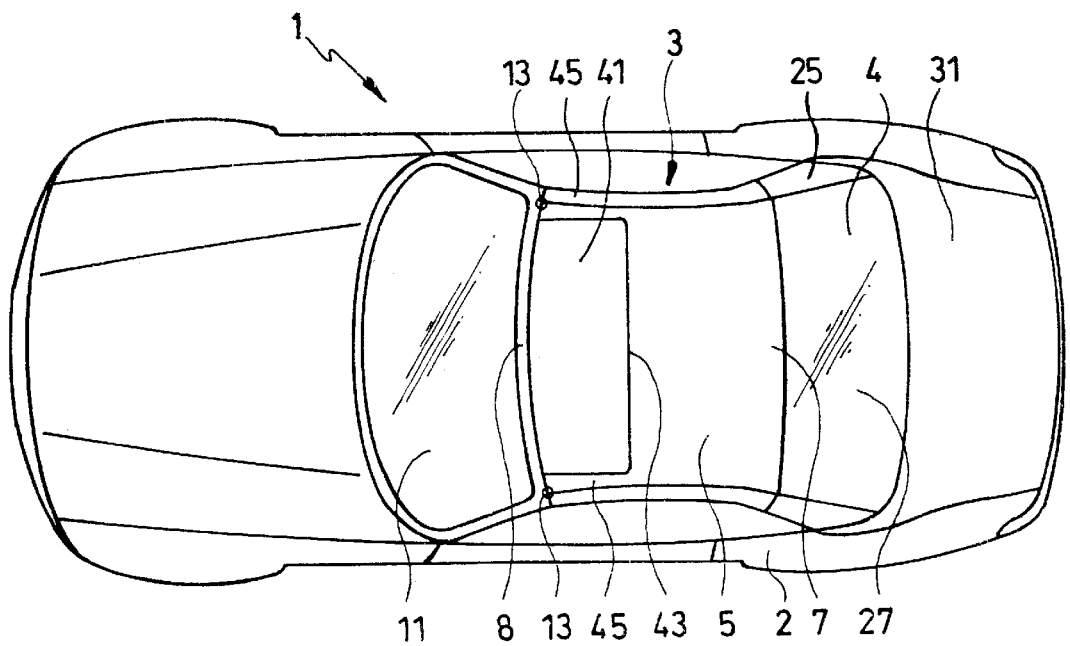
FIG. 2 is a plan view of the motor vehicle as shown in FIG. 1.

In FIGS. 1 & 2, a convertible 1 has a body 2 with a roof arrangement 3 is composed of multiple parts that form a convertible vehicle roof which can be inserted as a roof module into the body 2.

The roof arrangement 3 has a rear part 4 and a front roof part 5 which is arranged essentially horizontally and the front end section of which is detachably connected to the top transverse member (apron) 8 of the windshield 11 via a lock mechanism 13 (shown only schematically).

Figure 3:
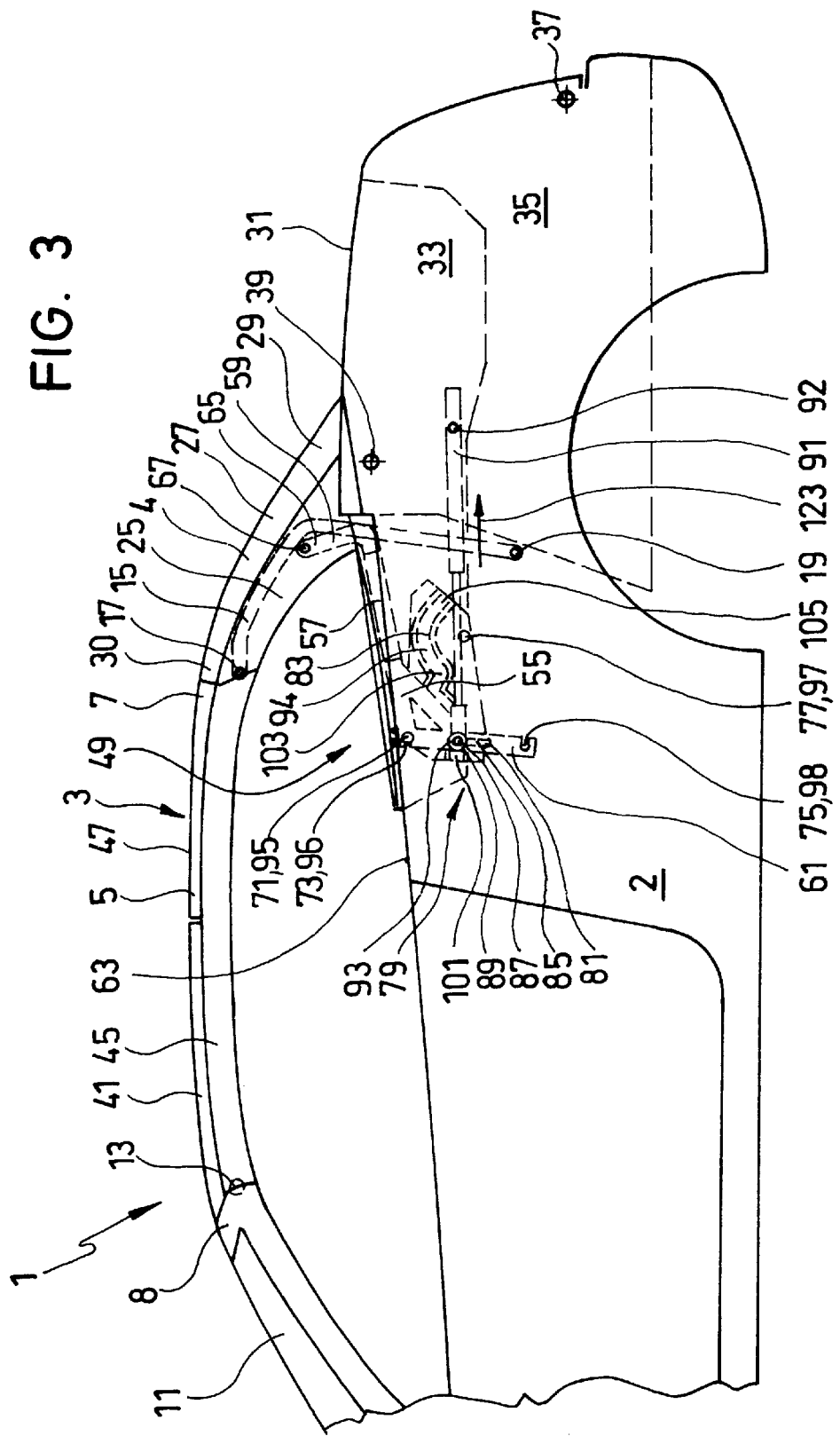
FIG. 3 shows a side view of the rear area of the convertible with the forced control mechanism for opening and closing the roof arrangement.

As shown in FIG. 3, the rear end section of the front roof part 5 is connected at each lateral side to the body 2 via a respective pivoting lever 15. Pivoting lever 15 is connected via a pivot joint 17 to the back end section 7 of the roof part 5 and via a pivot joint 19 to the body 2. The pivot joint 19 is located laterally in the rear area behind a backrest 21 of the rear seat 23, roughly at half the height of the backrest 21. The pivoting lever 15 is C-shaped and is configured such that it is held by the side member 25 of the rear roof part 4. The rear roof part 4 together with the side pivoting levers 15, which assume the function of the C column, form a roll cage for the motor vehicle 1.

Between the back end section 7 of the front roof part 5 and the rear area of the vehicle body is the rigid rear roof part 4 which drops away obliquely to the rear and which is provided with a rear window 27. The lower section 29 of the rear roof part 4 sits on the rear hatch 31, forming a seal. Under the rear hatch 31 is a storage compartment 33 for storing the lowered roof arrangement 3. The storage compartment 33 is used, at the same time, as the trunk space 35. The rear hatch 31 can be swung up via the rear axis of rotation 37 (shown only schematically in FIG. 3) to the rear to enable access to the storage compartment 33 and the rear hatch 31 can be swung up around a front axis 39 of rotation (also shown only schematically in FIG. 3) to the front in order to enable access to the trunk 35.

The roof part 5, on the front end section adjacent to the cross beam 8 of the windshield 11, has a cover 41 which can be pushed to the rear in the manner of a conventional sliding sunroof over the rear part of the front roof part 5 so that, with the cover 41 opened, a roughly rectangular opening 43 is formed in the front area of the front roof part 5. The opening 43 is bounded on each side by a post-like side roof part 45. A lock mechanism 13 for connecting the side roof parts 45 to the cross beam member 8 is located in the front end section of each side roof part 45.

Instead of making the cover 41 as a sliding roof which is guided outwardly over the roof skin 47 of the roof part 5, the cover 41 can also be made as a sliding and lifting roof which is moved down and under the roof skin 47 of the front roof part 5. Furthermore, the cover 41 can also be formed as a sliding roof formed of a host of louvers which can be pushed to the rear.

In the following, the structure of the forced control mechanism 49 is explained with reference to FIGS. 3 & 4. The forced control mechanism 49, which includes the already mentioned pivoting lever 15, is located on both sides of the body 2 in an area laterally relative to the backrest 21 of the back seat 23. The forced control mechanism 49 is used to swing the rear roof part 4 over the front roof part 5 and locks to the roof part 5 via a locking means 51 in that position, and afterwards, swings the resulting roof package 53 to the rear into the storage compartment 33.

The forced control mechanism 49 has a Z-shaped lever 55 which, with the roof arrangement 3 closed (FIG. 3), has a horizontally arranged middle section 57, a rear section 59 and a front leg 61. The middle section 57 is located underneath the side top body edge 63. The rear leg 59 extends up into the side beam 25 of the rear part 4 and is mounted on its end section 65 via a first pivot joint 67 to the rear part 4 in the area of the line of gravity of the rear part 4. The front leg 61 extends down into the side body 2. A brace 69, which is located obliquely between the front leg 61 and the middle section 57, is used to strengthen the lever 55. On the transition area between the middle section 57 and the front leg 61, there is an inner mounting point 71 on the front leg 61 with which the lever 55 can be connected via a second pivot joint 73 to the body 2. On the lower end side of the front leg 61, there is an outer mounting point 75 with which the lever 55 can be connected to the body 2 via a third pivot joint 77. In the position shown in FIG. 3 with the closed roof arrangement 3, the lever 55 is connected by its inner mounting point 71 to the second pivot joint 73. The third pivot joint 77 is located behind and underneath the second pivot joint 73 at a distance which corresponds to the distance between the inner and the outer mounting points 71 and 75.

Figure 4:
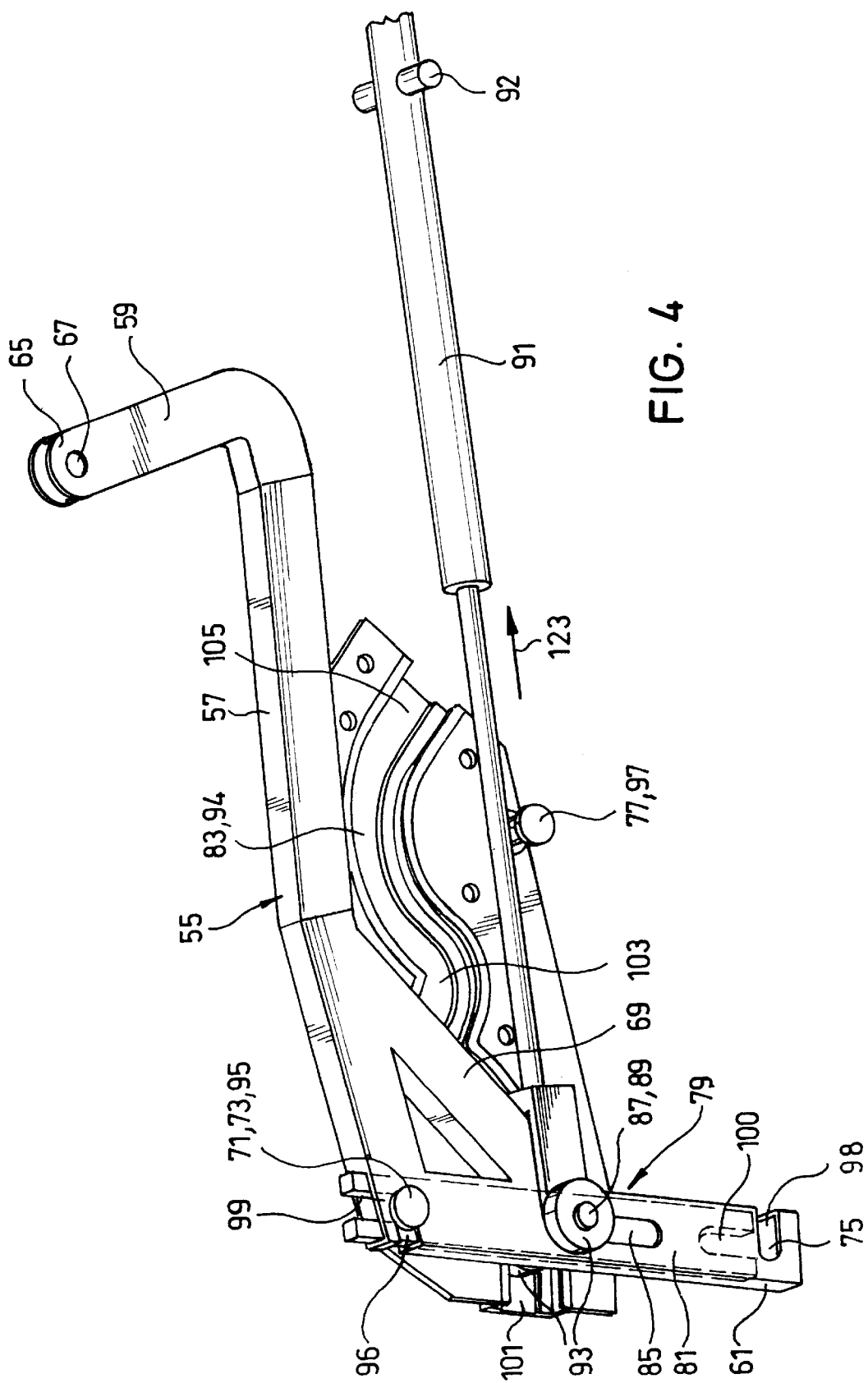
FIG. 4 shows a detailed oblique view of part of the forced control mechanism.
Figure 5:
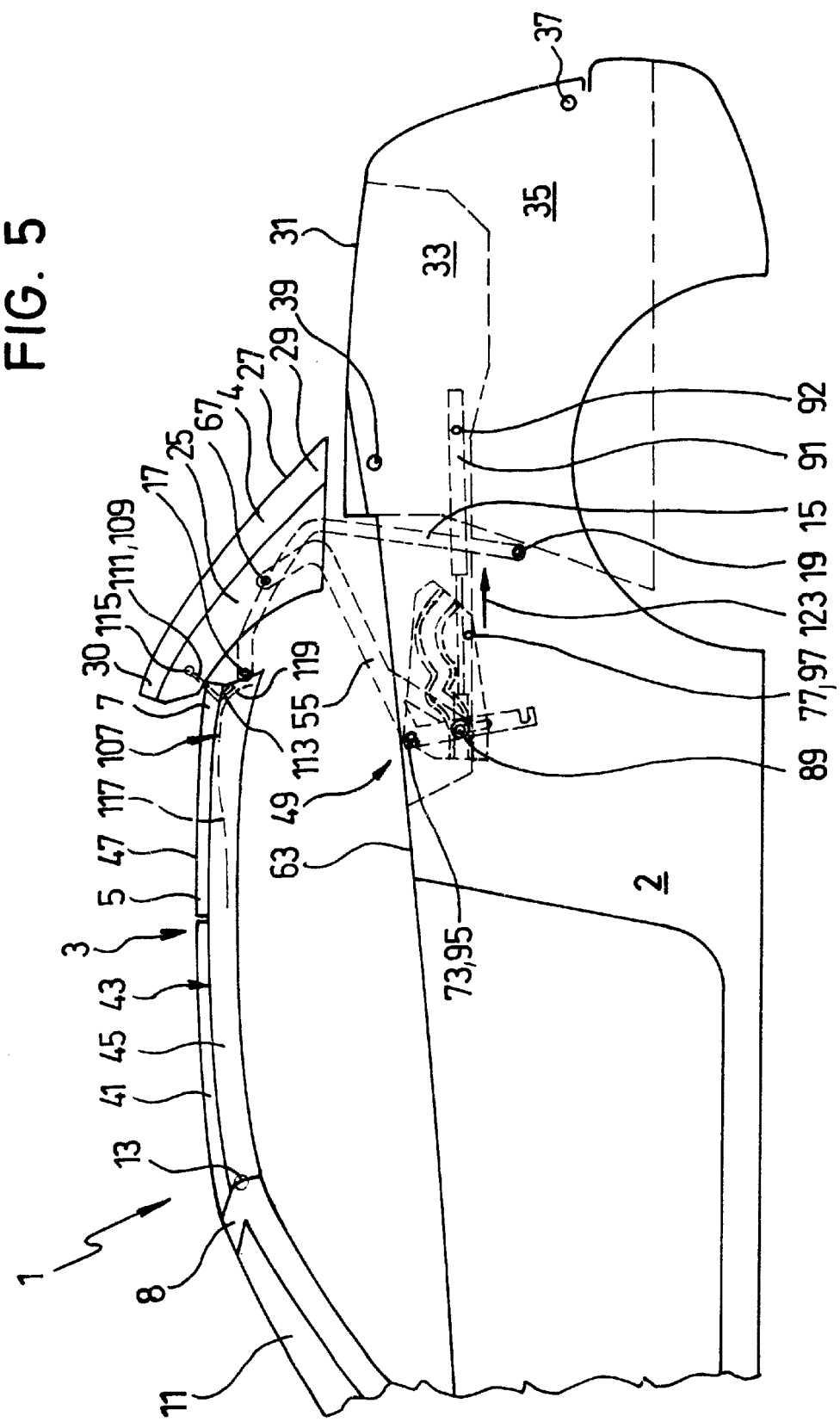

In FIGS. 3 & 4, there is a switching means 79 in the front leg 61. With this switching means 79, the connection of the inner mounting point 71 to the second pivot joint 73 can be released and the connection of the outer mounting point 75 to the third pivot joint 77 can be established, and vice versa, when the lever 55 is in a position (see FIG. 6) in which, at the same time, the inner mounting point 71 of the lever 55 engages the second pivot joint 73 and the outer mounting point 75 engages the third pivot joint 77. Reversal takes place in this position by locking either the inner or the outer mounting point 71, 75 to the pivot joint 73, 77, respectively.

For this purposes, the switching means 79 has a sliding bolt 81 which is supported to be pushed back and forth between the two mounting points 71, 75 in the front leg 61, which is made as a rectangular tube. The position of the sliding bolt 81 is controlled by a guide track 83 as is described below.

In the middle section of the front leg 61, in the side walls of the front leg 61, a opening 85 is formed through which a pin 87 which is attached to the sliding bolt 81 extends on either side of the front leg 61. On the pin 87, via a fourth pivot joint 89, a lifting cylinder 91, which is made in the form of a hydraulic cylinder, is connected to the front end of its piston rod. The lifting cylinder 91 in FIG. 3 is positioned roughly horizontally and is connected at its other end to the rear body 2 via a fifth pivot joint 92. The lifting cylinder 91 is used as the main drive for the forced control mechanism 49. On both end of the pin 87 there is a roller 93, each of which is guided to follow the path 94 of the guide track 83 which partially surrounds the roller 93.

The second pivot joint 73 has a pin 95 which is attached to the body 2 and which can fit into a U-shaped opening 96 which is pointed forward and which is made on the inner mounting point 71 of the lever 55. The third pivot joint 77 has a pin 97 which is attached to the body 2 and which can fit into a U-shaped opening 98 which is pointed to the rear and which is made on the outer mounting point 75. The sliding bolt 81 has a top fork 99 on its top end and a lower fork 100 on its bottom end, which open to the respective end. In FIG. 3, the U-shaped opening 96 of the inner mounting point 71 engages the pin 95 of the second pivot joint 73 and the sliding bolt 81 is pushed towards the inner mounting point 71, its top fork 99 surrounding the pin 95, thus locking the lever 55 with its inner mounting point 71 to the second pivot joint 73. In this position, the opposite outer mounting point 75 is in the unlocked position so that the U-shaped opening 98, which is pointed to the rear, can be engaged with the pin 97 of the third pivot joint 77.

The path 94 of the guide track 83 is fixed on the body, is arranged essentially horizontally, and has three sections, a circular front path section 101, a straight middle path section 103 and an arcuate rear path section 105. The front path section 101 has its middle point in the pin 95 of the second pivot joint 73, the radius of the circle being chosen such that the sliding bolt 81 is held in the locking position for locking the inner mounting point 71 to the second pivot joint 73. The rotary angle of the front path section 101 corresponds to the angular distance which must be traversed by the lever 55 when turning counterclockwise around the second pivot joint 73 to swing the rear part 4 from the lower closed position of the roof arrangement 3 into the position over the roof part 5. The front path section 101 is adjoined by the middle path section 103 which runs as a straight line between the pin 95 of the second pivot joint 73 and the pin 97 of the third pivot joint 77, the length of the middle path section corresponding to the path traversed by the sliding bolt 81 from an inner locking position to an outer locking position. The rear path section 105 which adjoins the middle path section 103 has its midpoint in the pin 97 of the third pivot joint 77, the radius of the circle being chosen such that the sliding bolt 81 can be kept in the locking position for locking of the outer mounting point 75 to the third pivot joint 77. The angle of rotation of the rear path section 105 corresponds to the angular path which must be traversed by the lever 55 when turning clockwise around the third pivot joint 77 in order to swing the front roof part 5, with the rear roof part 4 located over it, into the rear storage compartment 33 for the folding roof.

Between the upper end section 30 of the rear part 4 and the rear end section 7 of the roof part 5, on both sides of the vehicle, there is a respective guide mechanism 107 with which the upper end section 30 of the rear part 4 is guided in the roof part 5 during pivoting motion over the roof part 5 (FIGS. 5 to 8). The guide mechanism 107 has a L-shaped slide lever 109 which has one long leg 111 and one short leg 113. The long leg 111 is coupled via an eighth pivot joint 115 to the top end section 30 of the rear part 4, and with the roof arrangement 3 closed it is located essentially horizontally.

The short leg 113 is guided in a slide rail 117 which is made in the direction of travel laterally on the roof part 5 (shown only schematically). The slide rail 117 which is preferably located in a groove in the roof part 4 and which is aligned parallel to the roof skin 47 in the rear end section, has a section 119 which is curved down to enable pivoting of the long leg 111 from the horizontal position into the vertical position around the short leg 113 which is used as the pivot joint and vice versa. The motion of the slide lever 109 takes place depending on the motion of the rear part 4 relative to the roof part 5.

Instead of providing a guide mechanism, on the first pivot joint 67 between the lever 55 and the rear part 4, there can also be a rotary drive with which the rear part 4 can be swung around the first pivot joint 67 when pivoting up over the roof part 5 relative to the lever 55.

The locking means 51 (shown only schematically) is located between the roof part 5 and the rear part 4 in order to securely lock the rear part 4 on the roof part 5 after it has been swung over the roof part 5, so that the roof part 5 and the rear part 4 form a roof package unit 53. The locking means 51 can also be designed to lock the rear end section 8 of the roof part 5 to the upper end section 30 of the rear part 4 with the roof arrangement 3 closed in order to stabilize the roof arrangement 3 in the closed position.

Figure 6:
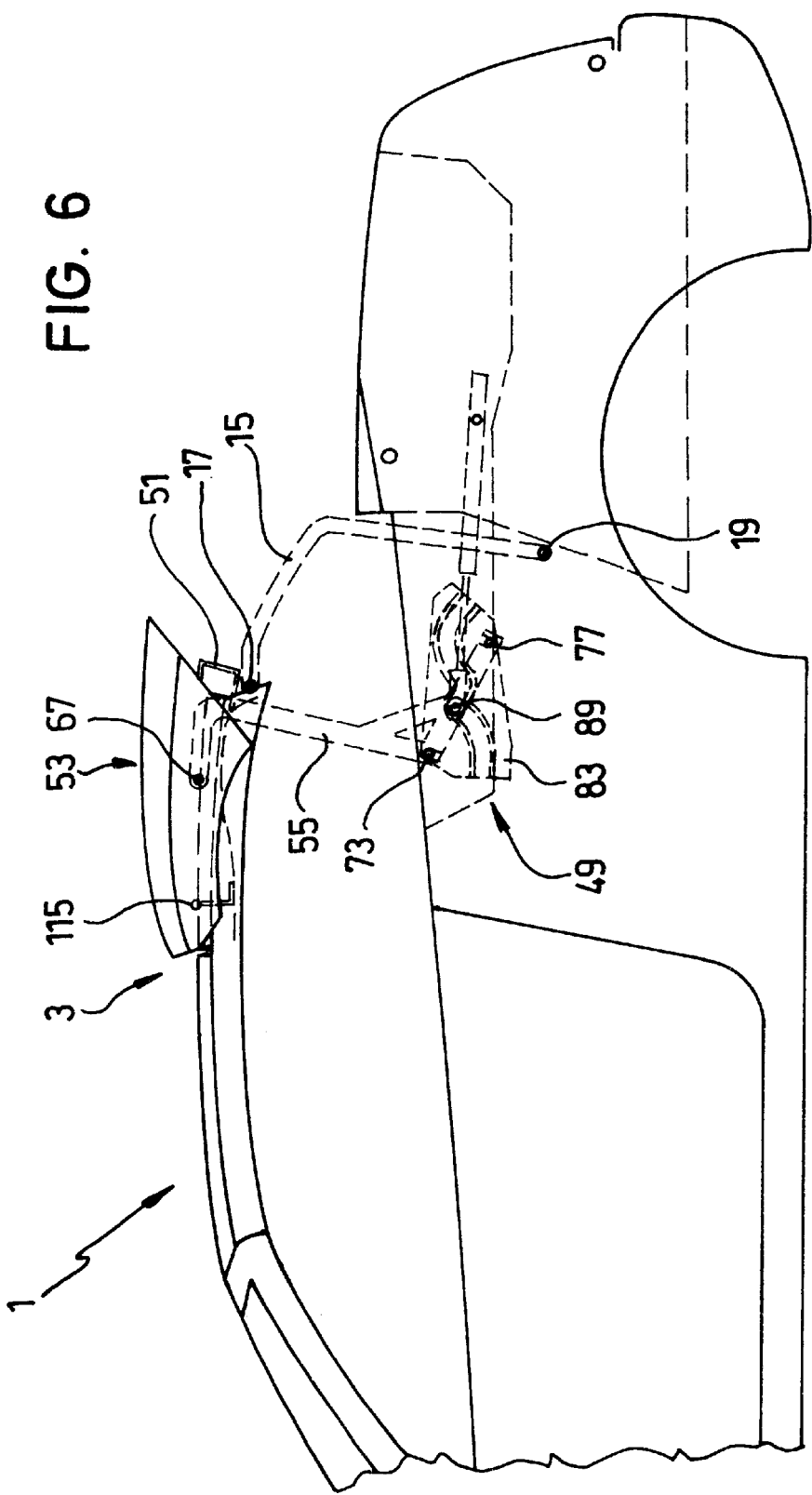

In the following, the operation of opening and closing the roof arrangement 3 is explained with reference to FIG. 3 and FIGS. 5 to 9. FIG. 3 shows the roof arrangement 3 in the closed position and at this point it can be transferred into the opened position via the forced control mechanism 49. For the case in which there is locking of the rear part 4 to the roof part 5 and/or to the rear area of the body 2, this locking must first be released. In this initial situation, the lever 55 is connected by its inner mounting point 71 via the second pivot joint 73 to the body 2. The lifting cylinder 91 is moved in the direction of the arrow 123 so that the lever 55 turns counterclockwise around the second pivot joint 73. The rear part 4 is initially raised up vertically by the arrangement of the second pivot joint 73 and the lever 55. The slide lever 109 of the guide means 107 swings around the eighth pivot joint 115 and around the short leg 113 so that the top end section 30 of the rear part 4 is raised over the back end section 8 of the roof part 5 (FIG. 6). The lifting cylinder 91 continues to swing the lever 55 until the rear part 4 is positioned completely over the roof part 5 adjacent to the roof skin 47, the top end section 30 of the rear part 4 being guided via the slide rail 117 of the guide means 107 along the roof part 5.

Before, during or after pivoting of the rear part 4 over the roof part 5 the cover 41 can be pushed to the rear to expose the U-shaped opening 43. The cover 41 comes to rest between the roof skin 47 and the rear part 44. This arrangement has the advantage that the headroom in the interior is greater than for a cover 41 which is pushed to under the roof skin 47 for opening.

As soon as the rear part 4 is lifted far enough from the front end section of the rear hatch 31, the latter can be opened about the rear axis 37 of rotation, upward to the rear so that the storage compartment 33 for the folding top becomes accessible for lowering the roof arrangement 3.

If the rear part 4 is located over the roof part 6, the roller 93 must traverse the circular front path section 101 of the crank 83. In this position, the U-shaped opening 98 of the outer mounting point 75 of the lever 55 engages the pin 97 of the third pivot joint 77. The continuing motion of the lifting cylinder along the straight middle path section 103 of the crank 83 pushes the sliding bolt 81 to the pin 97 of the third pivot joint 77, the locking of the inner mounting point 71 to the second pivot joint 73 being released, and at the same time, locking of the outer mounting point 75 to the third pivot joint 77 being effected. During this reversing process, no parts of the roof arrangement 3 are moved. In this interrupted motion, for the roof arrangement 3, on the one hand, the rear part 4 can be interlocked to the roof part 5 in the position stacked on top of one another by the locking means 121, and on the other hand, the side roof parts 45 can be released from the upper cross member 9 of the windshield 11 via the lock mechanism 13.

After completion of the switching process, the lever 55 is unlocked from the second pivot joint 73 and is interlocked to the third pivot joint 77. By the continuing motion of the lifting cylinder 91, the roller 93 now reaches the rear path section 105 of the crank 83. The lever 55, at this point, begins to turn clockwise around the third pivot joint 77, the lever 55 and the pivoting lever 15 forming a four-bar mechanism between the roof arrangement 3 and the body 2. The first pivot joint 67 is now located in the rear area of the front roof part 5 over it, the first pivot joint 67 being located in front of and above the sixth pivot joint 17. In the rear area of the body, the third pivot joint 77 is likewise located in front of and above the seventh pivot joint 19, the distance between the first pivot joint 67 and the third pivot joint 77 roughly corresponding to the distance between the sixth pivot joint 17 and the seventh pivot joint 19 so that the four-bar mechanism is made almost as a parallelogram.

Therefore, upon further movement of the lifting cylinder 91 (FIGS. 7 to 9) the entire roof arrangement 3 is swung into the rear storage compartment 33. In doing so, the side roof parts 45 are lowered into the side body 2 next to the back seats 23 so that the U-shaped opening 43 surrounds the back seats 23, the top of the side roof parts 45, moreover, being used as the cover for the side body 2. At this point, the rear hatch 31 can again be closed around the rear axis 37 of rotation, the rear hatch 37 covering the area behind the rear seats 23. If the roof arrangement 3 is located in the storage compartment 33, the roller 93 must traverse the rear path section 105 of the crank 83.

The closing process of the roof arrangement 3 proceeds in the reverse sequence.

It should be noted as especially advantageous in the switching of the body-side end of the lever 55 from the second pivot joint 73 to the third pivot joint 77 that the third pivot joint 77 is located behind the second pivot joint 73 such that the roof arrangement 3 stacked on top of one another can be swung with the same lever 55 further into the rear area of the vehicle 1.

It is furthermore advantageous in this arrangement that only one lever 55 is necessary for pivoting up the rear part 4 over the roof part 5, the same lever 55 also executing the lowering motion together with the pivoting lever 15. It should be noted as especially advantageous that, aside from the locking mechanisms and the motion of the rear hatch, the entire operation of opening and closing the roof arrangement 3 takes place by a drive in the form of a lifting cylinder 91.

The invention can also be used for a roof arrangement 3 without a movable cover 41 when the front roof part 5 is correspondingly short, for example, in a two-seater vehicle 1.

Furthermore, the side roof parts 45 can also be made to swing so that the side roof parts 45 are swung about a vertical axis of rotation towards the center of the U-shaped recess.

What is claimed is:

1. Roof arrangement for a convertible with a rigid front roof part, a rigid rear roof part, a storage compartment for the roof parts located in a rear area of a vehicle body, and with a forced control mechanism for opening and closing the roof arrangement such that, to open the roof arrangement, first the rear roof part is swung over the front roof part and then the front roof part together with the rear roof part stacked over it is swung into the storage compartment; wherein the forced control mechanism has a single lever which is located between the rear roof part and the rear body and which is connected at a first end to the rear roof part via a first pivot joint and is coupled at a second end to the vehicle body wherein the second end of the lever is connected to the body selectively either via a second pivot joint or a third pivot joint spaced from the second pivot joint, the third pivot joint being located behind and underneath the second pivot joint.

2. Roof arrangement as claimed in claim 1, wherein the first pivot joint is located in a line of gravity of the rear part.

3. Roof arrangement as claimed in claim 1, wherein the storage compartment also comprises a trunk space and is covered by a rear hatch which is selectively swingable via a rear axis of rotation upward and toward the rear for receipt of the front roof part together with the rear roof part stacked over it and is swingable via a front axis of rotation forward and upward for stowage of luggage.

4. Roof arrangement as claimed in claim 1, wherein an inner mounting point for the second pivot joint and an outer mounting point for the third pivot joint are provided on the lever, the distance between the inner mounting point and the outer mounting point corresponding to the distance between the second pivot joint and the third pivot joint.

5. Roof arrangement as claimed in claim 1, wherein a switching means is provided with which the lever is selectively connected either on the inner mounting point to the second pivot joint or on the outer mounting point to the third pivot joint.

6. Roof arrangement as claimed in claim 5, wherein the switching means has a sliding bolt which is located on the lever and which can be actuated via the motion of the lever, and wherein the sliding bolt is supported to move by sliding back and forth on the lever between the inner mounting point and the outer mounting point, and the sliding bolt is movable back and forth via a guide track from one locking position into another locking position.

7. Roof arrangement as claimed in claim 1, further comprising a drive with which the lever is turned counterclockwise when the lever is attached to the second pivot joint, and with which the lever can be turned clockwise when the lever is attached to the third pivot joint.

8. Roof arrangement as claimed in claim 7, wherein the drive comprises a lifting cylinder, a first end of which is connected at an outer mounting point on a section of the lever between an inner mounting point, said first end of the lifting cylinder being connected transversely to a direction of extension of the lever via a fourth pivot joint, and wherein a second end of the lifting cylinder is connected to the body via a fifth pivot joint.

9. Roof arrangement as claimed in claim 7, wherein said first end of the lifting cylinder is connected via the fourth pivot joint to the sliding bolt and is guided together with the sliding bolt in a guide track.

10. Roof arrangement as claimed in claim 1, wherein the forced control mechanism has a guide means between the rear roof part and the front roof part for guiding the rear roof part during pivoting thereof over the front roof part.

11. Roof arrangement as claimed in claim 10, wherein the guide means has a slide lever which is coupled at a first end to the rear roof part and is movably coupled at a second end in a slide rail which is located on the front roof part lengthwise along the vehicle body.

12. Roof arrangement as claimed in claim 1, wherein a locking means is provided between the rear roof part and the front roof part interlocking the rear roof part over the front roof part and with the roof arrangement closed.

13. Roof arrangement as claimed in claim 1, wherein, between a rear section of the front roof part and the rear area of the vehicle body, there is a pivoting lever which is connected at a first end via a sixth pivot joint to the rear section of the front roof part and is connected at a second end via a seventh pivot joint to the rear area of the vehicle body.

14. Roof arrangement as claimed in claim 1, further comprising a drive with which the lever is turnable counterclockwise and clockwise; wherein a locking means is provided between the rear roof part and the front roof part interlocking the rear roof part over the front roof part and with the roof arrangement closed; and wherein, when the rear roof part is swung over the front roof part and is locked to the roof part, the single lever and a pivoting lever forming a four-bar mechanism between the vehicle body and the roof arrangement with which the stacked roof arrangement is swingable by the drive into the rear storage compartment.

15. Roof arrangement as claimed in claim 14, wherein the four-bar mechanism is substantially a parallelogram four-bar mechanism.

16. Roof arrangement as claimed in claim 1, wherein the front roof part is detachably connected via a lock mechanism to an upper cross beam of a windshield.

17. Roof arrangement as claimed in claim 1, wherein the front roof part has a cover which is movable to expose an opening in the front roof part which is U-shaped when viewed from above with a post-like side roof part projecting forward in a direction of travel at each side of the opening.

18. Roof arrangement as claimed in claim 17, wherein, when the roof arrangement is lowered, the side roof parts are lowered into side body sections which border the back seats.

19. Roof arrangement for a convertible with a rigid front roof part, a rigid rear roof part, a storage compartment for the roof parts located in a rear area of a vehicle body, and with a forced control mechanism for opening and closing the roof arrangement such that, to open the roof arrangement, first the rear roof part is swung over the front roof part and then the front roof part together with the rear roof part stacked over it is swung into the storage compartment; wherein the forced control mechanism has a single lever which is located between the rear roof part and the rear body and which is connected at a first end to the rear roof part via a first pivot joint and is coupled at a second end to the vehicle body wherein the forced control mechanism has a guide means between the rear roof part and the front roof part for guiding the rear roof part during pivoting thereof over the front roof part.

20. Roof arrangement as claimed in claim 19, wherein the guide means has a slide lever which is coupled at a first end to the rear roof part and is movably coupled at a second end in a slide rail which is located on the front roof part lengthwise along the vehicle body.

* * * * *